S. G. WILCOX.
TROLLEY GUARD.
APPLICATION FILED NOV. 18, 1908.
937,495.
Patented Oct. 19, 1909.
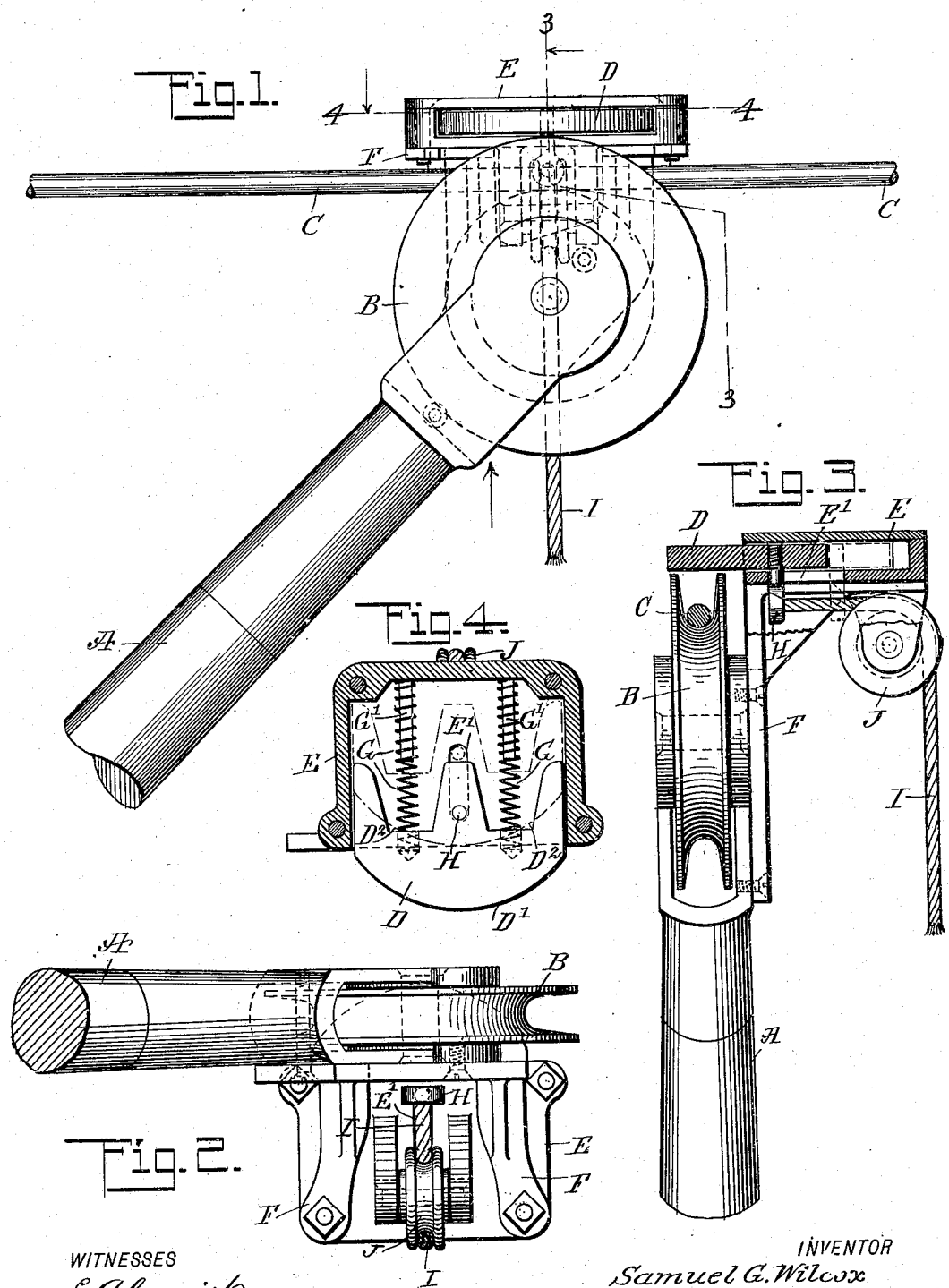
WITNESSES
INVENTOR
Samuel G. Wilcox
BY
ATTORNEYS

UNITED STATES PATENT OFFICE.

SAMUEL GROSE WILCOX, OF NORTH ADAMS, MASSACHUSETTS.

TROLLEY-GUARD.

937,495.

Specification of Letters Patent. Patented Oct. 19, 1909.

Application filed November 18, 1908. Serial No. 463,179.

*To all whom it may concern:*

Be it known that I, SAMUEL GROSE WILCOX, a citizen of the United States, and a resident of North Adams, in the county of Berkshire and State of Massachusetts, have invented a new and Improved Trolley-Guard, of which the following is a full, clear, and exact description.

The object of the invention is to provide a new and improved trolley guard, in the form of a spring-pressed slidable plate, normally extending across the top of the trolley wheel, to prevent the trolley wheel from accidentally leaving the trolley wire, the plate readily passing the trolley wire hanger, and the arrangement permitting the withdrawing of the plate by the operator, at the same time pulling down the trolley pole whenever it is desired to do so.
The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied; Fig. 2 is an inverted plan view of the same; Fig. 3 is a transverse section of the same, on the line 3—3 of Fig. 1; and Fig. 4 is a sectional plan view of the same on the line 4—4 of Fig. 1.
On the upper end of the trolley pole A is journaled the usual trolley wheel B, engaging with its peripheral groove the trolley wire C. Across the top of the trolley wheel B extends a plate D, to normally keep the trolley wheel B from leaving the trolley wire C, the said plate D being mounted to slide transversely in a suitable guideway or a casing E, bolted or otherwise attached to a bracket F secured to the trolley pole A, as plainly illustrated in the drawings. The outer edge D' of the plate D is preferably curved, as plainly indicated in Fig. 4, and the inner edge of the plate is provided with recesses D², against which bear springs G held on pins G' attached to the inside of the guideway or casing E, as plainly shown in Fig. 4. A screw eye H is secured to the plate D and extends downward through a slot E' in the bottom of the guideway or casing E, and on the said screw eye H is secured one end of a rope I extending over a pulley J journaled on the casing E, the free end of the rope I extending to the ground, to be within convenient reach of the operator. Now by the arrangement described the plate D is pressed outward by the spring G and the outer sliding movement of the plate D is limited by the screw eye H engaging the end wall of the slot E' in the bottom of the casing E. The plate D projects across the top of the grooved trolley wheel B, so as to prevent the wheel from leaving the wire C, and when the plate D reaches a hanger for the trolley wire C, then it is first pushed inward against the tension of the springs G, for the plate to pass the hanger, the plate after leaving the hanger immediately returning to normal position by the action of the springs G. As the edge D' is curved, it is clear that the contact of the plate D with the hanger is gradual, and consequently the plate D slides readily inward and outward while passing the hanger. In case the necessity should arise, the operator on pulling on the rope I, can withdraw the plate D, and on a further pull on the rope I, the pole A can be swung downward in case it is desired to do so.

The device is very simple and durable in construction and can be readily applied to trolley wheels as now constructed without requiring change in the trolley pole or wheel.

Having thus described my invention, I claim as new and desire to secure by Letters Patent:

1. A trolley guard, comprising a bracket for attachment to the trolley pole adjacent to the trolley wheel, a guideway on the said bracket, and a spring-pressed plate mounted to slide transversely in the said guideway and normally extending across the top of the grooved trolley wheel to prevent the groove in the trolley wheel from leaving the trolley wire.

2. A trolley guard, comprising a bracket for attachment to the trolley pole adjacent to the trolley wheel, a guideway on the said bracket, a spring-pressed plate mounted to slide transversely in the said guideway and normally extending across the top of the grooved trolley wheel to prevent the groove in the trolley wheel from leaving the trolley wire, a rope connected with the said sliding plate, and a pulley journaled on the said guideway and over which passes the said rope to the ground, to permit the operator to pull the rope down and thereby first withdraw the said plate and then pull down the trolley pole.

3. A trolley guard, comprising a bracket for attachment to the trolley pole adjacent to the trolley wheel, a guideway on the said bracket, a spring-pressed plate mounted to slide transversely in the said guideway and normally extending across the top of the grooved trolley wheel to prevent the groove in the trolley wheel from leaving the trolley wire, a rope connected with the said sliding plate, and a pulley journaled on the said guideway and over which passes the said rope to the ground, to permit the operator to pull the rope down and thereby first withdraw the said plate and then pull down the trolley pole, the free end of the plate being rounded off to readily engage and be pushed inward by the hanger for the trolley wire.

4. A trolley guard, comprising a bracket for attachment to the trolley pole adjacent to the trolley wheel, a guideway on the said bracket and provided in its bottom with an elongated slot, a spring-pressed plate mounted to slide transversely in the said guideway and normally extending across the top of the grooved trolley wheel to prevent the groove in the trolley wheel from leaving the trolley wire, an eye secured to the said plate and extending through an elongated slot in the bottom of the said guideway, to limit the outward sliding motion of the said plate, a rope attached to the said eye, and a pulley journaled on the said guideway and over which passes the said rope.

In testimony whereof I have signed my name to this specification in the presence of two subscribing witnesses.

SAMUEL GROSE WILCOX.

Witnesses:
WILLIAM G. CADY,
PETER KEEFE.